United States Patent [19] | [11] 4,091,522
Suermann et al. | [45] May 30, 1978

[54] METHOD OF ASSEMBLING A CABINET FRAME AND DOOR TO PERMIT INTERNALLY COATING SAME

[75] Inventors: Robert E. Suermann; Edwin G. Wall, both of Elizabeth City, N.C.

[73] Assignee: Triangle Pacific Corp. (TriPac), Dallas, Tex.

[21] Appl. No.: 748,246

[22] Filed: Dec. 6, 1976

[51] Int. Cl.[2] .......................... B23P 3/00; B23P 19/04

[52] U.S. Cl. ........................................ 29/460; 16/129; 220/335; 427/300; 427/401

[58] Field of Search .......................... 29/434, 458, 460; 16/129, 128 R; 427/300, 401, 421; 220/334, 335

[56] References Cited

U.S. PATENT DOCUMENTS

| | | | |
|---|---|---|---|
| 689,797 | 12/1901 | Erwin | 29/460 X |
| 877,321 | 1/1908 | Gebler | 29/460 |
| 1,920,741 | 8/1933 | Bol | 29/460 |
| 2,335,865 | 12/1943 | Lanigan et al. | 427/401 X |
| 2,345,775 | 4/1944 | Smith et al. | 427/401 X |
| 2,598,756 | 6/1952 | Brightly et al. | 29/460 X |
| 3,227,575 | 1/1966 | Ziebart | 427/421 X |
| 3,878,585 | 4/1975 | Morris | 16/128 R |

*Primary Examiner*—Charlie T. Moon
*Attorney, Agent, or Firm*—William R. Liberman

[57] ABSTRACT

A hinge of the semi-concealed, wrap-around type is provided with a slot extending transversely to the hinge axis so that with the cabinet door assembled to the door leaf of the hinge, the frame leaf of the hinge (which in its finally installed position seats on the edge of the frame) can be shifted to and temporarily secured in an angular orientation and forwardly of its finally installed position. In this position most of the parts of the frame which are ultimately covered by the frame leaf are exposed for a surface coating operation, and the door itself is in a position generally corresponding to a partly open position to facilitate the application of the coating to the inside face of the door. After the coating operation is completed the frame leaf is shifted to its finally installed position and secured to the cabinet frame.

2 Claims, 5 Drawing Figures

METHOD OF ASSEMBLING A CABINET FRAME AND DOOR TO PERMIT INTERNALLY COATING SAME

BACKGROUND OF THE INVENTION

1. Field of the Invention

The invention pertains to the art of cabinet door hinges and to the method of assembling cabinets for the purposes of applying a surface coating to the cabinet frames and doors.

2. Description of the Prior Art

Mass produced kitchen cabinets and similar cabinets often have the cabinet doors fastened to the cabinets with hinges prior to the cabinet and doors undergoing coating operations during which material such as stain, lacquer, and shading coatings are applied. It is frequently desirable that the hinges be of the type which can be adjusted on the frame to obtain proper alignment of the doors and to regulate clearances. Thus many of the hinges used are provided with slots rather than circular holes for the screw fasteners so the hinge leafs can be adjusted relative to either the frame or the door. However, where the hinges have been installed on the door and frame before the finishing operation, the shifting of a hinge leaf relative to either the door or the frame results in an exposure of unfinished "white" wood where the leaf has been shifted off of the unfinished "white" wood area in the adjustment.

In addition to the problem of the exposure of "white" wood during minor adjustment of the cabinet doors with respect to all types of kitchen cabinets, another problem relating to door reversal exists with respect to base kitchen cabinets which are manufactured with a toe space at the bottom front. Thus the cabinet cannot be inverted if it is desired to reverse the direction of door opening for a single door base cabinet. Of course it would be possible to reverse while the hinge mounting can be reversed to obtain an opposite side fastening, this leaves unfinished areas on the frame where the frame leaf of the hinge was mounted.

In accordance with our invention, we have devised a modified semi-concealed, wrap-around type hinge which can be used in a way that permits substantially all of the frame area to receive a surface coating and in which the door is held partly open to facilitate the coating operations to obtain the economic benefits of a substantially premounted arrangement during the surface coating operations.

SUMMARY OF THE INVENTION

In accordance with the method aspect of the invention, the door is assembled to the cabinet frame with a semi-concealed, wrap-around type hinge by mounting the door leaf of the hinge to the cabinet door and securing the frame leaf of the hinge to the cabinet frame in a temporary, coating-operation position. In this position the frame leaf is both angularly oriented and forwardly spaced with respect to the frame, as compared to the finally installed position of the hinge. Thus with the hinge in its door-closed position the door is in a position corresponding generally to a partly open position to thereby facilitate the application of the coating to the inside face of the door and other surfaces normally not exposed when the door is in the closed position. Then after the coating operation has been completed, the frame leaf of the hinge is shifted to its finally installed position in wrap-around relation to the frame and is secured thereat.

To carry out this method the hinge, which in its general configuration corresponds to a conventional, semi-concealed, wrap-around hinge, is provided with a slot generally transverse to the slot provided for making vertical adjustments of the hinge. In other words, the bight portion of the frame leaf of the hinge has a T-shaped slot with the slot transverse to the hinge axis permitting the positioning of the hinge frame leaf in its angularly oriented and forward position to hold the door partly open and at an angle during the finishing operation.

DRAWING DESCRIPTION

DESCRIPTION OF THE PREFERRED EMBODIMENT

Figure 1:
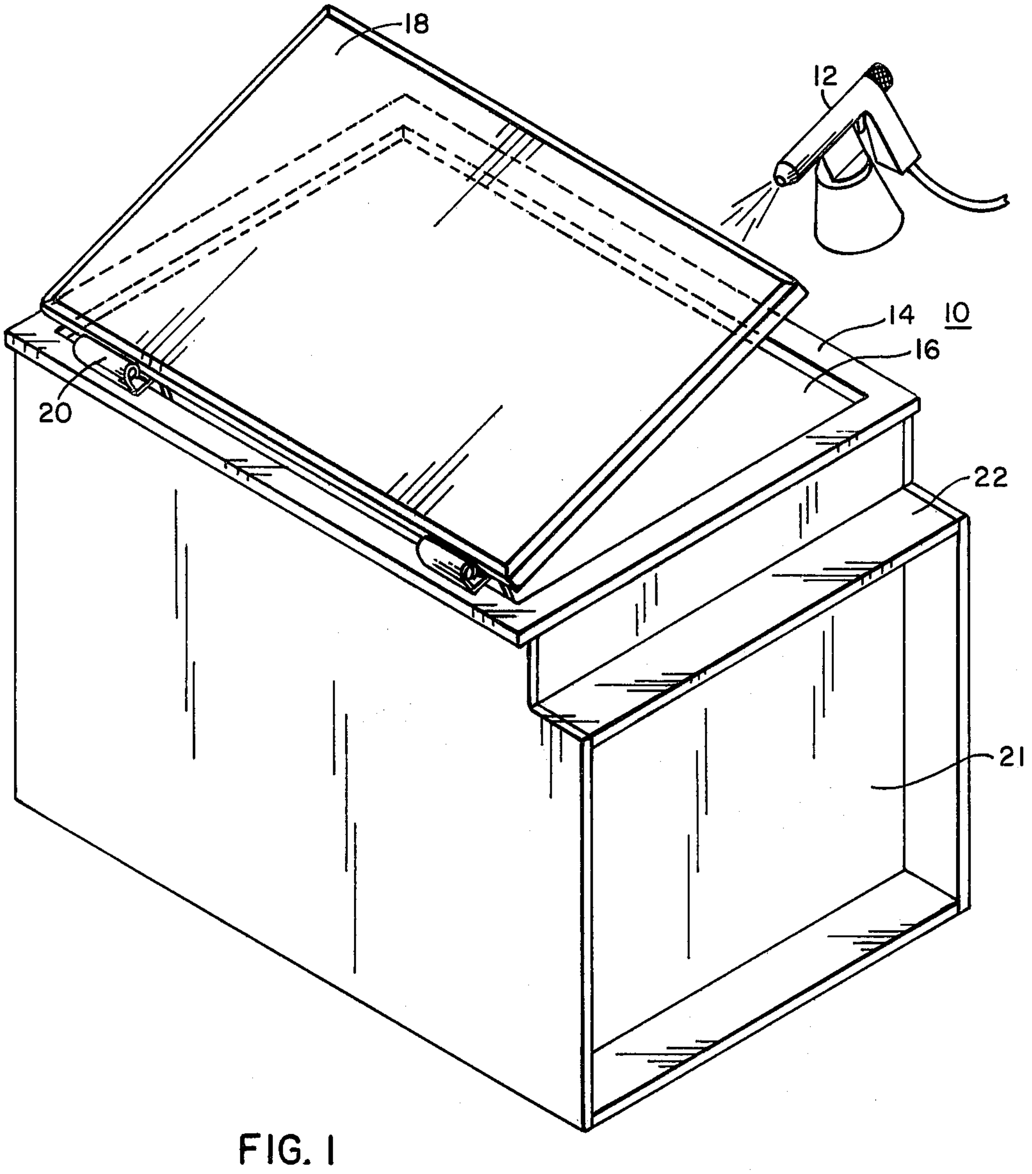
FIG. 1 is an isometric view of a typical base cabinet in its assembled position to undergo a surface coating operation.

Referring to FIG. 1, a typical kitchen cabinet 10 is illustrated in an assembled condition particularly suiting it for the application of the surface coating materials such as stains and lacquers which may be applied in various ways including the use of a spray gun 12. The parts of the base cabinet of particular interest in connection with the invention include the front wall frame 14 with an access opening 16 therein which in normal use of the cabinet is adapted to be closed by the door 18. The door is illustrated as being hingedly fastened along its left-hand edge to the front frame 14 by hinges 20. Since the cabinet illustrated is of the base type, it is designed so that when finally installed its bottom end will rest upon the floor with the toe space generally indicated by the numeral 22 being adjacent the bottom front of the cabinet. As shown in FIG. 1, the cabinet is upon its back with the door 18 in a partly open position, which position is herein termed a coating operation position and which facilitates the application of the coatings to the inside face of the door and other surfaces which are normally not exposed when the door is in a closed position. The way in which this is accomplished and the particular hinge structure used for that purpose will be explained in somewhat more detail in connection with the remaining figures of the drawing.

Figure 2:
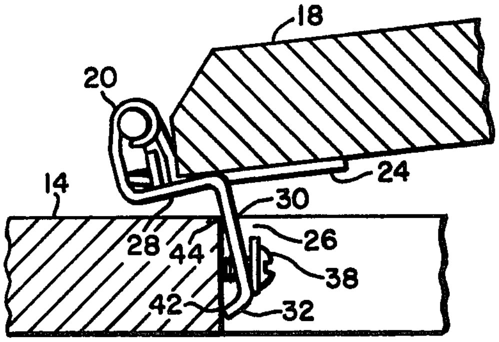
FIG. 2 is a sectional view corresponding to one taken generally along the line II-II of FIG. 1 illustrating the hinge in a temporary, coating operation position.
Figure 3:
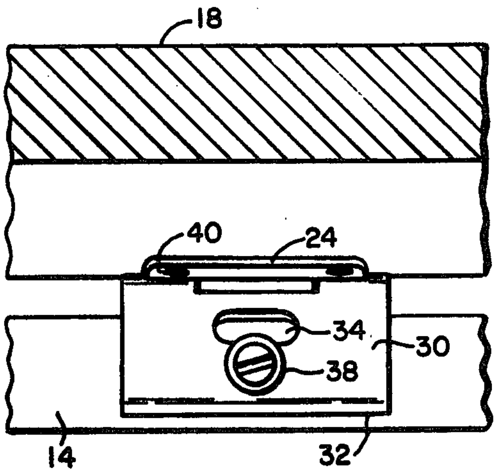
FIG. 3 is a view of the door and hinge in the temporary, coating operation position as viewed from the right of FIG. 2.

In FIGS. 2 and 3, the hinge 20 is shown in its coating operation position which results in the door 18 being held in a partly open position as shown in FIG. 1. The basic structure of the hinges 20 is that of a conventional, vertically adjustable, semi-concealed, wrap-around type hinge. As such, the hinge includes a door leaf 24, a portion of which is adapted to be fastened against the inner face of the door 18, and a frame leaf generally designated 26 including a generally J-shaped portion adapted to be seated in wrap-around relation to the edge portion of the cabinet front wall frame 14. The parts of the J-shaped portion of particular interest here include the relatively longer leg 28 which is adapted to seat on the front face of the frame 14 in the finally installed position of the frame leaf, a bight portion 30 which is adapted to seat against the edge face of the frame portion 14 in the finally installed position of the hinge, and a relatively short distal end leg 32 which is adapted to be located facing the inner face of the frame edge portion with the hinge finally installed.

Figure 5:
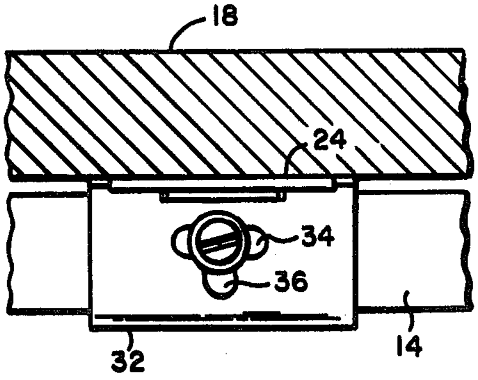
FIG. 5 is a view similar to FIG. 3 but with the hinge in its finally installed position.

The bight section 30 has a slot arrangement best seen in FIGS. 3 and 5 in the two different positions of the frame leaf of the hinge. The T-shaped slot arrangement includes one slot 34 which accommodates the vertical adjustment of the hinge relative to the frame 14, this slot being parallel to the axis of the hinge, and a transverse slot 36 which extends from the vertical slot 34 toward the distal end leg of the frame leaf. Thus, the bar portion of the T-slot is used for the vertical adjustment of the hinge, while the stem portion of the T is used to accommodate the positioning of the hinge as shown in FIGS. 2 and 3, with the use of a single mounting wood screw 38.

In carrying out the method according to the invention, the door leaf 24 of the hinge is secured to the inner face of the door 18 by mounting screws, the heads 40 of which may be seen only in FIG. 3. The frame leaf 26 is then secured to the frame 14 in the disposition shown in FIGS. 2 and 3 by turning mounting screw 38 into its preset hole so that the hinge is in its temporary, coating operation position with the end edge 42 of the distal end leg being in substantially line contact with the edge of the frame 14, and the front corner 44 of the frame edge being in substantially line contact with the inner face of the bight section 30 of the frame leaf. In this position it will be seen that, save for the line contact locations, the surfaces of the frame 14 to be coated are exposed to the application of the coating by a spraying process. The positioning of the hinge in this manner also results in the door 18 being in a partly opened position to facilitate the application of the coatings.

Figure 4:
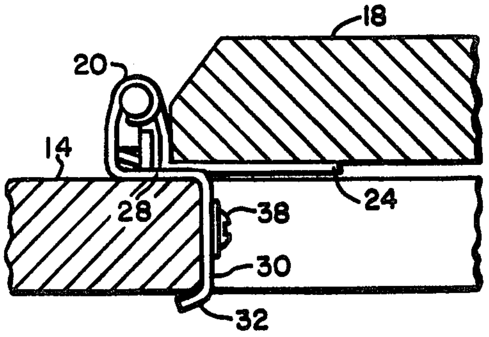
FIG. 4 is a view similar to FIG. 2 but with the hinge moved to its finally installed position.

After the coating operations are completed, the screw 38 is loosened and the frame leaf is shifted to its finally installed position (as shown in FIGS. 4 and 5) in which it is in wrap-around relation to the frame edge portion. The screw 38 is then turned in to secure the frame leaf in its finally installed position.

Since substantially all of the front and edge faces of frame 14 has been provided with a finish coating, the reversal of the door is possible by removing one screw 38 from each hinge and remounting the door on the opposite side frame edge portion in a premarked hole. The bare spot remaining from the old mounting position is semi-concealed on the inner side of the base cabinet front frame. This spot is considered negligible but can be touched up if desired.

While the invention has been described in connection with a base cabinet, its applicability to wall cabinets where there is no need for reversal ordinarily, will also be appreciated. By mounting the hinge as shown in FIGS. 2 and 3 for the coating operations, substantially all of the frame edge portion can receive a coating so that upon a subsequent vertical adjustment of the hinge, the exposure of "white" wood is avoided. At the same time that the hinge positioning for the coating operation yields that desired result, it also automatically functions as a door stop holding the door open partly during the finished operation. Previously, so far as we know, it has been necessary to use additional extraneous means to accomplish the holding of the door in a partly open position.

We claim:

1. The method of assembling a cabinet frame and door therefor with a semi-concealed, wrap-around type hinge, for a surface coating and finishing operation, comprising:

mounting the door leaf of the hinge to the cabinet door;

securing the frame leaf to the cabinet frame in a temporary, coating operation position in which the frame leaf is both angularly oriented and forwardly spaced with respect to the frame as compared to its finally installed position so that with the hinge in its door closed position the door is in a position generally corresponding to a partly open position to facilitate the application of the coating to the inside face of the door and other normally non-exposed surfaces when the door is in a closed position; coating the inside of said door and other normally non-exposed surfaces while said door is in said partially open position, and then after said coating operation has been completed, shifting said frame leaf to its finally installed position in wrap-around relation to said frame and securing said frame leaf thereat.

2. The method of claim 1 including:

adjusting said frame leaf in a direction parallel to the axis of the hinge after said frame leaf has been shifted to its wrap-around position.

* * * * *